US011659307B2

(12) United States Patent
Jarrot et al.

(10) Patent No.: US 11,659,307 B2
(45) Date of Patent: *May 23, 2023

(54) SUBSEA OILFIELD COMMUNICATIONS SYSTEM

(71) Applicant: ONESUBSEA IP UK LIMITED, London (GB)

(72) Inventors: Arnaud Jarrot, Somerville, MA (US); Julius Kusuma, Fremont, CA (US); Andriy Gelman, Somerville, MA (US); Arnaud Croux, Boston, MA (US); Sudhir Pai, Houston, TX (US); Neil Herbst, Phoenix, AZ (US); Jack Vincent, Katy, TX (US)

(73) Assignee: ONESUBSEA IP UK LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/321,860

(22) Filed: May 17, 2021

(65) Prior Publication Data

US 2021/0274270 A1 Sep. 2, 2021

Related U.S. Application Data

(63) Continuation of application No. 16/032,104, filed on Jul. 11, 2018, now Pat. No. 11,012,762.

(60) Provisional application No. 62/530,883, filed on Jul. 11, 2017.

(51) Int. Cl.
*H04Q 9/00* (2006.01)
*E21B 41/00* (2006.01)
*H04B 11/00* (2006.01)
*H04B 13/02* (2006.01)

(52) U.S. Cl.
CPC ............ *H04Q 9/00* (2013.01); *E21B 41/0007* (2013.01); *H04B 11/00* (2013.01); *H04B 13/02* (2013.01)

(58) Field of Classification Search
CPC ....... H04Q 9/00; E21B 41/0007; H04B 11/00; H04B 13/02
See application file for complete search history.

(56) References Cited

U.S. PATENT DOCUMENTS

| 7,873,437 | B2 | 1/2011 | Aldred et al. |
| 11,012,762 | B2 * | 5/2021 | Jarrot ............... H04B 11/00 |
| 2002/0154572 | A1 | 10/2002 | Mackenzie et al. |

(Continued)

FOREIGN PATENT DOCUMENTS

| EP | 3428383 A1 * | 1/2019 | ......... E21B 41/0007 |
| EP | 3428383 A1 | 1/2019 | |

(Continued)

OTHER PUBLICATIONS

Communication pursuant to Article 94(3) EPC issued in European Patent Aplication No. 18182953.2 dated May 18, 2022, 6 pages.

*Primary Examiner* — Daniel Pihulic
(74) *Attorney, Agent, or Firm* — Eileen Pape (57) ABSTRACT

A method for transmitting signals in a subsea environment includes determining that a quality of an acoustic signal is below a threshold. The acoustic signal travels from a first device, through water in the subsea environment, to a second device. A parameter of the first device, the second device, or both is then adjusted to improve the quality of the acoustic signal when the quality of the acoustic signal is below the threshold.

18 Claims, 4 Drawing Sheets

(56) References Cited

U.S. PATENT DOCUMENTS

2019/0020935 A1* 1/2019 Jarrot ..................... H04B 11/00
2021/0274270 A1* 9/2021 Jarrot ..................... H04B 11/00

FOREIGN PATENT DOCUMENTS

| GB | 2466252 A | 6/2010 |
| GB | 2477034 A | 7/2011 |
| JP | 2016144956 A | 8/2016 |

* cited by examiner

SUBSEA OILFIELD COMMUNICATIONS SYSTEM

CROSS-REFERENCE TO RELATED APPLICATIONS

This application is a continuation of co-pending U.S. patent application Ser. No. 16/032,104, filed on Jul. 11, 2018, which claims benefit of U.S. Provisional Patent Application No. 62/530,883, filed on Jul. 11, 2017. Each of the aforementioned related patent applications is hereby incorporated by reference.

BACKGROUND

In offshore oil and gas operations, acoustic telemetry can provide real-time monitoring and remote control of vehicles and subsea assets. Such telemetry can, for example, provide communication with sensors, autonomous underwater vehicles (AUVs), remotely-operated vehicles (ROVs), untethered remotely-operated vehicles (UROVs), and others. For simplicity, "AUV" is used herein to refer to untethered vehicles with some level of autonomy.

Acoustic telemetry is scalable: high bitrates can be obtained at short distances, and low bitrates can be obtained at long distances. However, subsea acoustic telemetry experiences signal absorption over the medium (e.g., water). This absorption becomes greater (i.e., worse) at higher frequencies and longer ranges. Further, this type of telemetry is subjected to noise from equipment, such as vessels, rigs, subsea factories, and debris in the ocean. Acoustic signal propagation is geometric, and therefore placement, directivity, and orientation of both transmitting and receiving elements can impact signal transmission. Further, the received signal can be subjected to platform dynamics. For example, the motion of the transmitting and receiving elements can induce systematic signal distortion.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method for transmitting signals in a subsea environment is disclosed. The method includes determining that a quality of an acoustic signal is below a threshold. The acoustic signal travels from a first device, through water in the subsea environment, to a second device. A parameter of the first device, the second device, or both is then adjusted to improve the quality of the acoustic signal when the quality of the acoustic signal is below the threshold. The method also includes adjusting parameters of a transducer of the first device, the second device, or both.

A method for transmitting signals in a subsea environment is disclosed. The method includes determining that a quality of an acoustic signal is below a threshold. The acoustic signal travels from a first device, through water in the subsea environment, to a second device. A parameter of the first device, the second device, or both is then adjusted to improve the quality of the acoustic signal when the quality of the acoustic signal is below the threshold. The method also includes adjusting an acoustic beam angle of the first device, the second device, or both.

A method for transmitting signals in a subsea environment is disclosed. The method includes determining that a quality of an acoustic signal is below a threshold. The acoustic signal travels from a first device, through water in the subsea environment, to a second device. A parameter of the first device, the second device, or both is then adjusted to improve the quality of the acoustic signal when the quality of the acoustic signal is below the threshold. At least one of the first device and the second device comprises a plurality of transducers.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

Sensors and Stations Network

Figure 1:
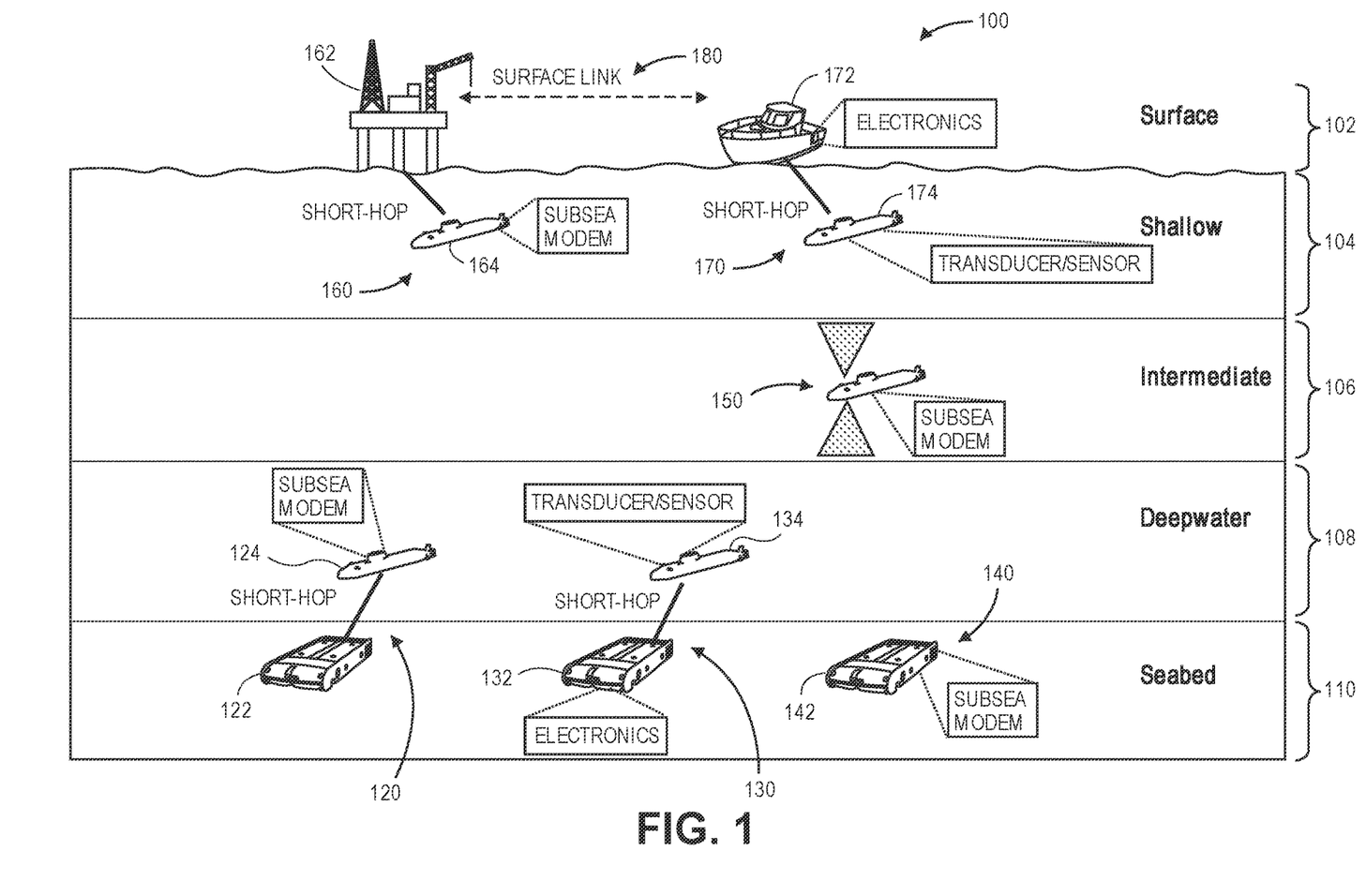
FIG. 1 illustrates a schematic view of a plurality of subsea communication systems, according to an embodiment.

FIG. 1 illustrates a schematic view of a plurality of subsurface communication systems 100, according to an embodiment. The systems 100 are generally partitioned, at least conceptually, in terms of depth below the water's surface. For example, as shown, the systems 100 may be partitioned into the following regions: surface 102, shallow 104, intermediate 106, deepwater 108, and seabed 110. The precise delineations between these regions (apart from surface 102, which is not under the water) may be chosen at any suitable depth according to a variety of implementation-specific factors which are beyond the scope of the present disclosure, with the general idea that relative depths matter more than absolute depth classifications. In general, a device in the deepwater 108 and/or seabed 110 can be a vehicle or equipment that is a far distance away from a surface system, with which it is to communicate. Thus, one or more intermediary devices in one or more of the regions 104, 106, 108 between the seabed 110 and the surface 102 may be called upon to enhance communications.

Several potential devices that may occupy the various regions are also illustrated. For example, a "short-hop" communication link 120 may be established between seabed hardware 122 and a vehicle 124, such as an AUV, positioned in the deepwater region 108. The AUV 124 may include a modem, which may be configured to communicate with one or more other (e.g., shallower) modems, as will be described in greater detail below. The short-hop communication link 120 may be wired or may be wireless (e.g., high bitrate). Moreover, the short-hop communication link 120 between surface/shallow and deepwater/seabed vessels can be any type of (e.g., restricted range) connection including acoustics, cable link, optical link, electromagnetic link, and radiofrequency link. In some embodiments, the short-hop communication link 120 can be provided by a rigid and/or articulating linkage, a cable, a flexible member, or the like. In some embodiments, the AUV 124 may include a towable body that is tethered to the AUV 124, with transducers/sensors positioned on the towable body.

Reference number 130 represents a short-hop communication link between seabed hardware 132 and another vehicle (e.g., an autonomous vehicle) 134, which may include a modem and/or a transducer. Reference number 140 represents seabed hardware 142 with a modem, which has established a communication link with another device. The seabed hardware 142 may also act as a relay station to receive and repeat communications.

Reference number 150 illustrates an intermediate-depth (e.g., autonomous) vehicle. The intermediate-depth vehicle 150 may include a modem with the ability to receive and transmit signals. In particular, the modem of the intermediate-depth vehicle 150 may have the ability to act as a repeater, relaying signals between two, far-apart devices. In some embodiments, the intermediate-depth vehicle 150 (e.g., an AUV) may act as a relay station, with smart transducers/sensors to sectorize, and/or bafflers to separate, upward and/or downward channels. In some embodiments, the AUV 150 may be connected to a towable body that may include the transducers/sensors, which may be connected via a short-hop (e.g., tethered to) the AUV 150.

Reference number 160 represents a short-hop link between a stationary surface structure (e.g., an oil platform) 162 and a subsea vehicle (e.g., ROV) 164 that is positioned in the shallow region 104 and includes a modem. The subsea vehicle 164 may be tethered to the surface structure 162 or may be wireless. The subsea vehicle 164 may be an ROV and may carry a subsea model, active acoustic elements, or both.

Reference number 170 illustrates a short-hop link between a mobile surface vessel (e.g., a ship, Wave Glider, etc.) 172 and a shallow-water, submersible vehicle 174, such as a towed device, ROV, AUV, etc. The surface vessel 172 can be a maneuverable vessel, a vessel with restricted maneuverability (e.g., a platform supply vessel (PSV)), or a vessel with no maneuverability (e.g., a floating production storage and offloading (FPSO)). Modem or transducer/sensor elements of the modem may be separated from the surface vessel 172 and (e.g., placed within shallow devices/vehicles), which may provide versatile positioning, in comparison to placing the modem/transducer elements on the surface vessel. In addition, an energy payload used to operate the submersible vehicle 174 (e.g. batteries) generally can be shared between surface and shallow vessels efficiently. Thus, there is gain to moving the modem components to the shallow-water devices, with little cost.

Reference number 180 illustrates a surface link between the stationary surface structure 162 and the surface vessel 172, which may be wireless such as a radiofrequency, optical, cable, etc., acting as a gateway to a rig or platform.

Example Applications for the System

Localization: At the surface, a structure 162 or vessel 172 may have access to a GPS signal and may therefore have a knowable, precise location on the Earth's surface. GPS coordinates can be transmitted at regular intervals to the shallow vessel 164, 174 using the short-hop link 160, 170. The relative distance between the shallow vessel 164, 174 and the surface structure or vessel 162, 172 can be estimated using the fusion of multiple sensors including an inertial navigation unit (including a set of gyroscopes and accelerometers), pressure depth sensors, and/or estimated direction of arrival from an array of acoustic sensors.

Placement for active noise avoidance and channel optimization: In some underwater communication environments, sources and receivers have a fixed position, and the receiver is used to correct the distortions of the propagation channel and alleviate the adverse effects of the noise on signal reliability. In the context of the network illustrated in FIG. 1, an additional degree of freedom is available as the positioning of the shallow vessel(s) 164, 174 and/or the deepwater vessels 124, 134 can be adjusted independently. As a result, the telemetry uplink and downlink can be enhanced following one or more of several different strategies.

For example, before communication is established, both shallow vessels 164, 174 and/or deepwater vessels 124, 134 can scan the environment (in this case a half-sphere horizon) to detect the presence of acoustic interferences (i.e., hot spots) at a given solid angle. If hot spots are identified, corresponding solid angles may be marked as unsuitable, as it may be considered likely to be problematic for communication. In following point-to-point communication, the position of the vessels 124, 134, 164, 174 may be adaptively adjusted such that the interferences with line of sight is minimized or at least reduced.

In another example, before the communication is established, an agreed-upon sequence of acoustic waveforms may be exchanged between the modems of the shallow vessels 164, 174 and/or deepwater vessels 124, 134. This allows both modems to assess the quality of the communication channel. If the channel is deemed to be unsuitable (e.g., due to a high signal-to-noise ratio), the position of the vessels 124, 134, 164, 174 may be adjusted until a proper channel is found. Within each cycle, additional parameters such as source and receiver focalization can also be modified so the effect of the propagation channel can be evaluated. Once a satisfactory configuration is identified, shallow vessels 164, 174 and/or deepwater vessels 124, 134 are locked in position and the communication may begin.

Uplink/downlink repeater: In underwater environments, and especially for wideband communication, attenuation in the underwater medium can be severe, such that the effective communication range is short. Further, even when signal attenuation is not severe, as the spatial coverage of the beam solid angle increases with distance, long-distance transmissions are likely to generate multiple reflections at the air-water and water-seabed interfaces. In such a case, the transmission power may be reduced, but generally at the cost of reducing the effective range, to reduce the interference caused by multipath propagation. In such case, an additional underwater vessel 150 at an intermediate level/depth can be employed as a repeater. This vessel 150 may receive the acoustic uplink signal and retransmit it (with eventual modifications) to the uplink. The downlink may proceed similarly, but in the opposite direction.

Further, even when attenuation is severe, a combination of baffling material, directional transducers, and signal design can be employed to enhance communication between two nodes via an intermediate device. As an example, signal design can be used to separate the channel through time-sharing, frequency-sharing, code-sharing, and/or sub-carrier sharing. Further, multi-user detection and network coding techniques can be used in this networked system such that efficient channel-sharing is possible. The position of the repeater, and the communication parameters used in the upper and lower links, can be jointly adjusted to enhance signal transmission depending on the situation.

Further, the two links may rely on different forms of communication. For example, when operating near a surface vessel 172 or equipment (e.g., on a structure 162) that is very noisy, an optical link may connect from the surface vessel 172 or the structure 162 onto a repeater displaced away from the noise source that then uses acoustic telemetry to communicate to the modem on the vehicle near the seabed. Similarly, in the seabed hardware 122, 132, 142, a modem or transducer/sensor elements may be placed away from noisy seabed equipment to mitigate the effect of noise, and connected to the equipment through various short-hop options.

Wireless multi-hop or relay network: The system 100 may facilitate underwater inspection and maintenance over very long distances (up to 100 km). For example, the autonomous vehicle 124, 134, 164, 174 may be able to travel at high speed (potentially faster than the surface vessel 172), and the surface vessel 172 may manage multiple autonomous vehicles 124, 134, 164, 174 that cover distinct underwater areas. Thus, the surface vessel 172 may be far off from the autonomous vehicle(s) 124, 134, 164, 174. The acoustic conditions from the autonomous vehicle(s) 124, 134, 164, 174 to the surface vessel 172 may be insufficient to provide a one-hop communication link. Further, tangential acoustic propagation can be challenging due to a "shadowing" effect. Accordingly, a network of communication nodes may be deployed to provide a multi-hop network. An example of such a configuration includes having a fixed seabed node, in which the transducer orientation may be adapted to communicate with an autonomous vehicle 124, 134 roaming within or in stationary positioned in one area. The seabed node 126 can also maintain the link with the surface vessel 172. Another configuration may use an autonomous vehicle 150 as a relay station. The parameters of the nodes such as location, transducer orientation, and physical layer parameters can be adapted depending on the acoustic conditions.

Multiple transducers/sensors array: Arrays of multiple transducers/sensors may be employed for enhancing bandwidth usage. An example is to adjust Q factors of the transducers and use multiple transducers in one modem to increase the available bandwidth. Further, transducers with several beam-forming angles may be employed, allowing the transducers to iteratively adjust the energy at the receiver node.

Synthetic aperture communication: In this configuration, two or more surface nodes (e.g., on the surface structure 162 and/or the surface vessel 172) listen for underwater communication. Precise timing on recorded samples using GPS clocks and measurement samples are exchanged via the surface link 180. One of the surface nodes may collect the samples from the configurations and decode the communication signal. This configuration may leverage spatial diversity to compensate for channel distortion and noise. The use of multiple transducers, sensor arrays, and synthetic aperture communication can be combined with smart placements, as described above.

Smart Signal Processing for Reliable Communication

Underwater acoustics can present challenges for several reasons. For example, vehicle motion (e.g., both transmitter and receiver) and changes in the channel (e.g., due to sea state variations, waves, movement of reflectors, etc.) can impact communication. This may be compensated for using "smart" signal processing. Further, noise from the vehicle or equipment that the modem or acoustic components are mounted on can be present. Additionally, a drop in signal quality and data rate as distance between the transmitter and receiver is increased, or is affected by noise, may also be experienced.

Figure 2:
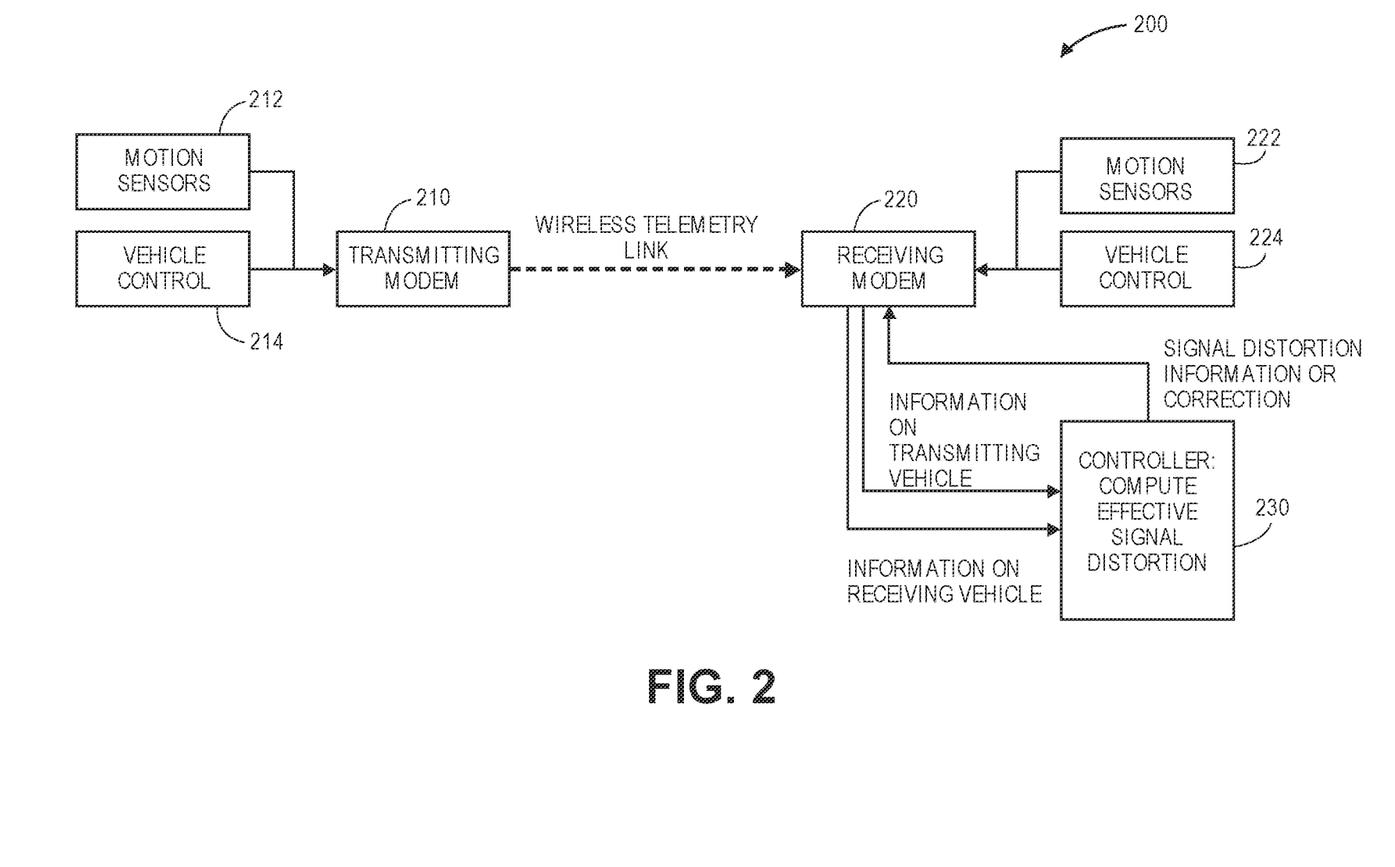
FIG. 2 illustrates a workflow diagram for using vehicle information to correct signal distortion, according to an embodiment.

Platform and vehicle dynamics, and derivative communication signal distortion parameters, may be distinguished using, for example, effective Doppler, frequency shifts, and/or time shifts. The latter can be derived from the former, but, in some embodiments, the former may not be derived from the latter. Accordingly, embodiments of the present disclosure may use vehicle state data to correct the transmitted and/or received signal. For example, if an estimate of vehicle motion is calculated, acceleration data can be derived and used to correct the telemetry signal, as shown in FIG. 2, which is discussed in greater detail below.

In one embodiment, a receiving modem can estimate an effective signal distortion parameter, and associate this parameter with a sender ID, to track its change over time. In another embodiment, a transmitting modem can compute effective signal distortion due to its own motion, and then apply pre-distortion or pre-compensation of its own signal such that it is easier to decode by a receiver, even if that receiver does not know the state of the transmitting modem's vehicle. In yet another embodiment, a transmitting modem can obtain vehicle motion data from its onboard sensor(s), and send this information to the receiving modems. Each receiving modem can then use this information, in addition to its own vehicle motion information, to derive the effective signal distortion parameter, which can then be used to make corrections.

There are several ways to send the relevant information. One way is to embed the information into the data packet. Another is to send the information over a more reliable link, for example, using a low-bitrate link. If vehicle or equipment noise is an impediment, the position, velocity, acceleration, etc., of the vehicle or the equipment can be adjusted to enable a higher signal-to-noise ratio. For example, the vehicle can be stopped or slowed, and the operation of pumps or compressors slowed or stopped. When a prediction or estimate of channel conditions based on modem positions and configurations are available, such information can be used. This way of adjusting vehicle position and velocity in order to enhance signal quality may be particularly useful when this vehicle is conveying either sensors and/or transducers, or acting as a relay station.

In some embodiments, machine learning can be used to increase signal transmission quality. For example, machine learning can be used to learn about environment and noise. Further, classification and identification of obstacles or noise sources can be achieved. Acoustics can be used to learn about the underwater environment. A framework for enhancing signal reception may be based on conditions, with a handshaking protocol to adapt spatial apertures based on received signal quality. Sensor data can also be applied to learn about noise from specific structures.

FIG. 2 illustrates a workflow diagram 200 of a signal transmission system 100, according to an embodiment. As shown, the system 100 may include a transmitting modem 210, which may be or be a part of a first device, and a receiving modem 220, which may be or be a part of a second device. The first and second devices may also each include or be coupled to one or more motion sensors 212, 222 and a vehicle controller 214, 224. The receiving modem 220 may also be coupled to a controller 230 configured to compute effective signal distortion. The receiving modem 220 may pass along information on the receiving vehicle (second device) and information regarding the transmitting vehicle (first device). Such information may include the position of the respective devices, transmission angles, etc. The controller 230 may calculate signal distortion information or correct and pass such information back to the receiving modem 220. In turn, the second device may adjust its position, or signal the first device to adjust its position, or may change the operation of equipment, to reduce the signal distortion, if the distortion is above a certain level.

Figure 3:
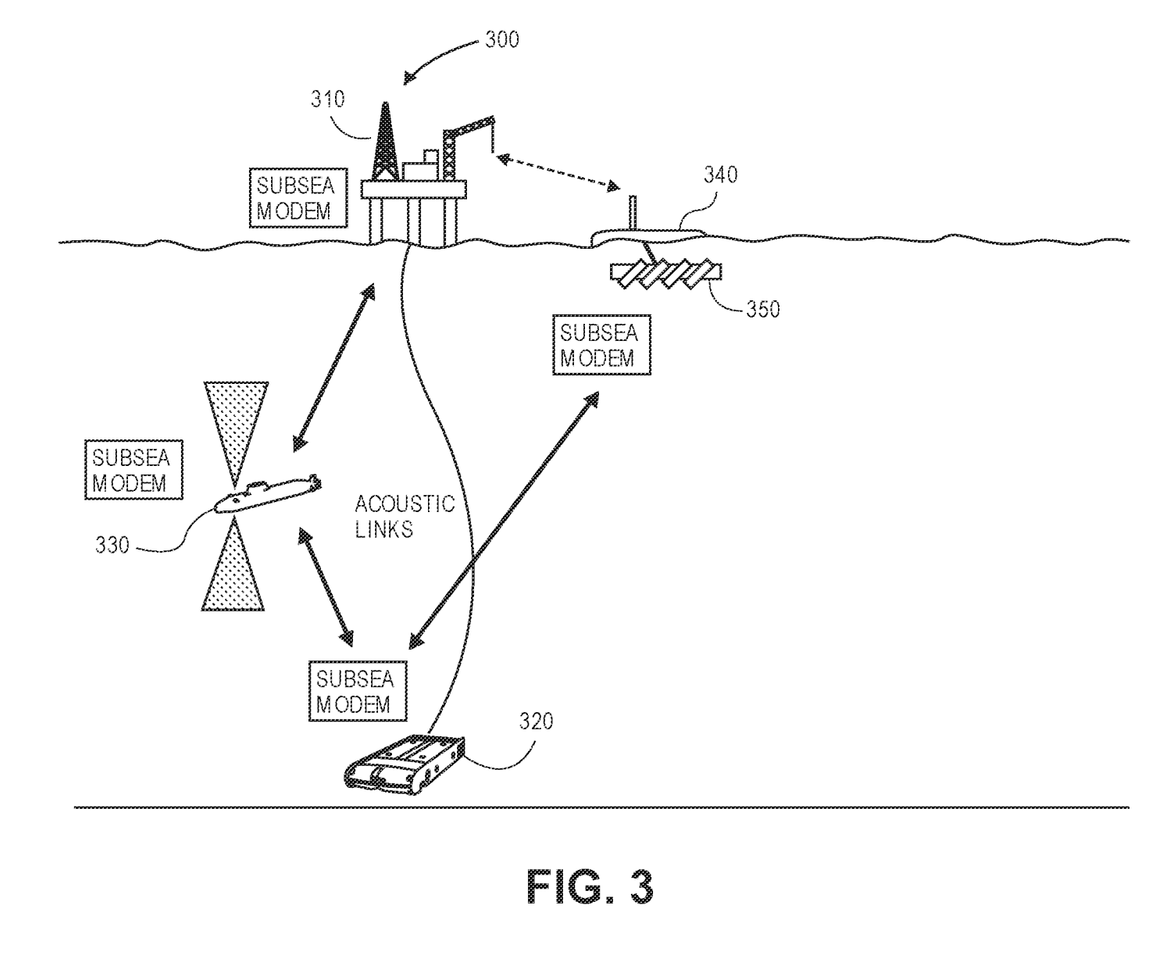
FIG. 3 illustrates a schematic view of an operation of a subsea communication system, according to an embodiment.

FIG. 3 illustrates a schematic view of an operation of a subsea communication system 300, according to an embodiment. On the left side, a link is established between a surface structure 310 and a seafloor device 320 via an intermediate-depth vehicle 330 (acting as a signal repeater). On the right side, a link is established between a surface vehicle 340, towing, wired to, or otherwise in short-hope communication with a shallow vessel 350 that includes a modem. It will be appreciated that these links can be combined, e.g., such that the intermediate depth vehicle 330 acts as a repeater to send/receive communication to/from a shallow vessel (or a deepwater vessel in short-hop communication with seabed devices).

Figure 4:
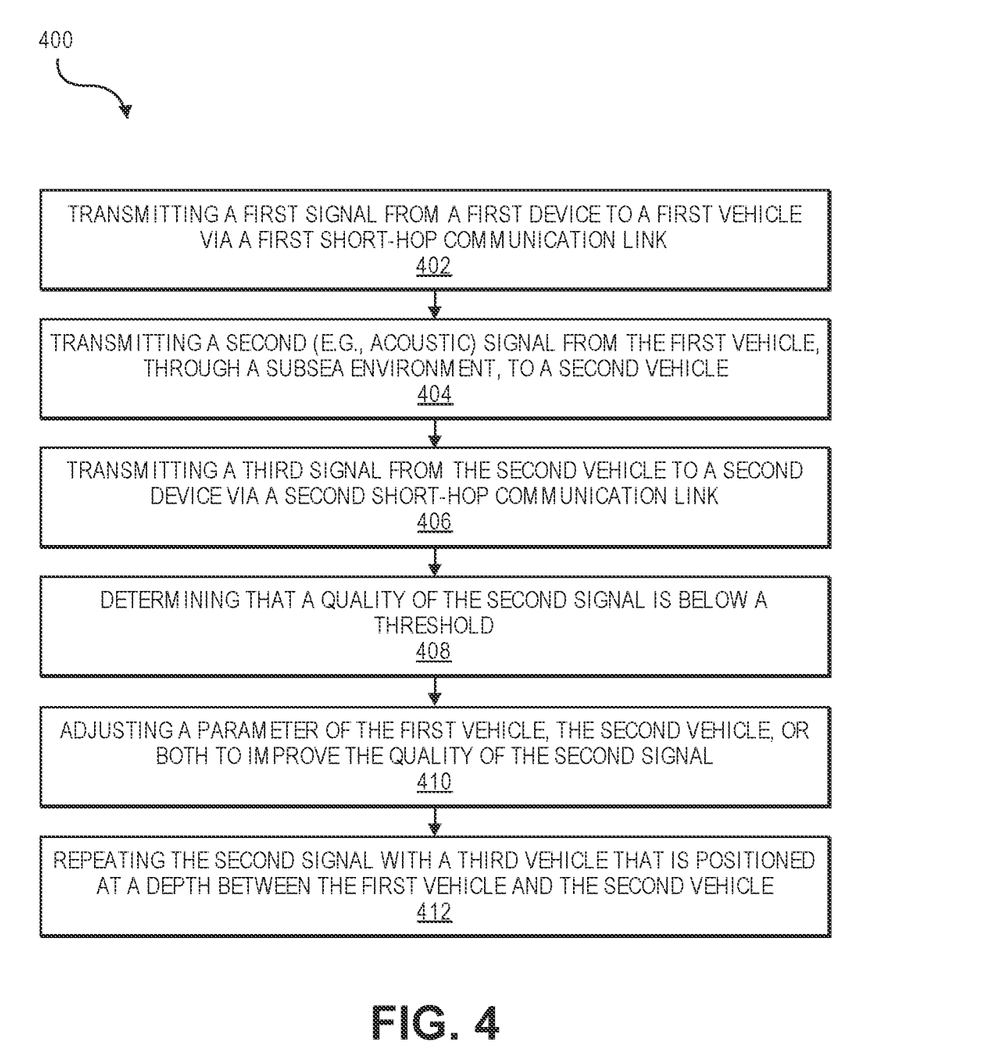
FIG. 4 illustrates a flowchart of a method for communicating in a subsea environment, according to an embodiment.

FIG. 4 illustrates a flowchart of a method 400 for communicating in a subsea environment, according to an embodiment. The method 400 may include transmitting a first signal from a first device to a first vehicle via a first short-hop communication link, as at 402. In at least one embodiment, the first device (e.g., hardware 122, 132, 142) is positioned on or proximate to the seabed 110, and the first vehicle 124, 134 is configured to move with respect to the first device. In another embodiment, the first device may be positioned on the structure 162 or the vessel 172, and the first vehicle 164, 174 is configured to move with respect to the first device.

The method 400 may also include transmitting a second signal from the first vehicle, through the subsea environment, to a second vehicle, as at 404. The second vehicle may be positioned at a different depth than the first vehicle. The second signal may be or include an acoustic signal.

The method 400 may also include transmitting a third signal from the second vehicle to a second device via a second short-hop communication link, as at 406. In at least one embodiment, the second device may be positioned on the structure 162 or the vessel 172, and the second vehicle 164, 174 is configured to move with respect to the second device. In another embodiment, the second device (e.g., hardware 122, 132, 142) is positioned on or proximate to the seabed 110, and the second vehicle 124, 134 is configured to move with respect to the second device. The first signal, the second signal, and the third signal may include at least some common data.

The method 400 may also include determining that a quality of the second signal is below a threshold, as at 408. In at least one embodiment, determining that the quality of the second signal is below the threshold may include the first vehicle and/or the second vehicle scanning the subsea environment between the first and second vehicles to detect the presence of acoustic interferences at a given solid angle. For example, the scanning may be or include a half-sphere horizon.

The method 400 may also include adjusting a parameter of the first vehicle, the second vehicle, or both to improve the quality of the second signal when the quality of the second signal is below the threshold, as at 410. Adjusting the parameter may cause the quality of the second signal to rise above the threshold. The parameter may be or include a position, velocity, and/or acceleration of the first vehicle (e.g., the vehicle 124, 134). The parameter may also or instead be or include a position, velocity, and/or acceleration of the second vehicle (e.g., the vehicle 164, 174). Adjusting the position, velocity, and/or acceleration of the first vehicle and/or the second vehicle may adjust the path of the second signal (e.g., to avoid acoustic interferences).

The parameter may also or instead be or include a strength of the second signal, a frequency or the second signal, a wavelength of the second signal, or a combination thereof. For example, the strength, frequency, and/or wavelength may be increased or decreased to improve the quality of the signal.

The parameter may also or instead be or include operation of equipment (e.g., pumps, compressors, motors, etc.). For example, equipment on or proximate to the seabed hardware 122, 132, 142, the vehicle(s) 124, 134, 164, 174, the structure 162, and/or the vessel 172 may be slowed or shut down to reduce acoustic interference.

The method 400 may also include repeating the second signal with a third vehicle that is positioned at a depth between the first vehicle and the second vehicle, as at 412. The third vehicle may be positioned in the water of the subsea environment. For example, the third vehicle may be or include the vehicle 150. Repeating the second signal may cause the strength (i.e., amplitude) of the second signal received by the second vehicle to be greater than if no repeater is used. In addition, transmitting the second signal from the first vehicle to the third vehicle to the second vehicle, or from the second vehicle to the third vehicle to the first vehicle, may enable the second signal to bypass an acoustic interference positioned in the line of sight between the first and second vehicles (e.g., when the third vehicle is not positioned along the line).

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for transmitting signals in a subsea environment, comprising:
   determining that a quality of an acoustic signal is below a threshold, wherein the acoustic signal travels from a first device, through water in the subsea environment, to a second device;
   adjusting a parameter of the first device, the second device, or both to improve the quality of the acoustic signal when the quality of the acoustic signal is below the threshold; and
   adjusting parameters of a transducer of the first device, the second device, or both;
   wherein the transducer comprises a plurality of beamforming angles to iteratively adjust the acoustic signal.

2. The method of claim 1, wherein determining that the quality of the acoustic signal is below the threshold comprises scanning the subsea environment to detect an acoustic disturbance in a transmission path between the first device and the second device.

3. The method of claim 2, wherein the acoustic disturbance is a hot spot, interference, noise, distortion, attenuation, or a combination thereof.

4. The method of claim 1, wherein adjusting the parameter of the first device, the second device, or both comprises adjusting a position, a velocity, or an acceleration of the first device, the second device, or both.

5. The method of claim 1, wherein adjusting the parameter of the first device, the second device, or both comprises slowing or shutting down noise-making equipment on or proximate the first device, the second device, or both.

6. The method of claim 1, wherein adjusting the parameter of the first device, the second device, or both comprises reducing a strength of the acoustic signal and further comprises repeating the acoustic signal at a third device that is positioned at a depth between the first device and the second device in the water in the subsea environment.

7. The method of claim 6, wherein the third device converts the acoustic signal to an optical signal for transmission near a noise source.

8. The method of claim 6, wherein the third device comprises a baffling material to separate upward and downward channels.

9. The method of claim 6, further comprising adjusting a position of the third device to improve the quality of the acoustic signal when the quality of the acoustic signal is below the threshold.

10. A method for transmitting signals in a subsea environment, comprising:
    determining that a quality of an acoustic signal is below a threshold, wherein the acoustic signal travels from a first device, through water in the subsea environment, to a second device;
    adjusting a parameter of the first device, the second device, or both to improve the quality of the acoustic signal when the quality of the acoustic signal is below the threshold; and
    adjusting an acoustic beam angle of the first device, the second device, or both.

11. The method of claim 10, wherein determining that the quality of the acoustic signal is below the threshold comprises scanning the subsea environment to detect an acoustic disturbance in a transmission path between the first device and the second device.

12. The method of claim 11, wherein the acoustic disturbance is a hot spot, interference, noise, distortion, attenuation, or a combination thereof.

13. The method of claim 10, wherein adjusting the parameter of the first device, the second device, or both comprises reducing a strength of the acoustic signal and further comprises repeating the acoustic signal at a third device that is positioned at a depth between the first device and the second device in the water in the subsea environment.

14. The method of claim 12, further comprising adjusting a position of the third device to improve the quality of the acoustic signal when the quality of the acoustic signal is below the threshold.

15. A method for transmitting signals in a subsea environment, comprising:
    determining that a quality of an acoustic signal is below a threshold, wherein the acoustic signal travels from a first device, through water in the subsea environment, to a second device; and
    adjusting a parameter of the first device, the second device, or both to improve the quality of the acoustic signal when the quality of the acoustic signal is below the threshold;
    wherein at least one of the first device and the second device comprises a plurality of transducers;
    wherein determining that the quality of the acoustic signal is below the threshold comprises scanning the subsea environment to detect an acoustic disturbance in a transmission path between the first device and the second device.

16. The method of claim 15, wherein the acoustic disturbance is a hot spot, interference, noise, distortion, attenuation, or a combination thereof.

17. The method of claim 15, wherein adjusting the parameter of the first device, the second device, or both comprises reducing a strength of the acoustic signal and further comprises repeating the acoustic signal at a third device that is positioned at a depth between the first device and the second device in the water in the subsea environment.

18. The method of claim 17, further comprising adjusting a position of the third device to improve the quality of the acoustic signal when the quality of the acoustic signal is below the threshold.

* * * * *